(No Model.)

J. TITLEY.
FENDER FOR STREET CARS.

No. 540,005. Patented May 28, 1895.

Witnesses:
Jos. H. Blackwood
Robert B. Blackwood.

Inventor
John Titley
by J. M. Doolittle & Son
Attorneys

UNITED STATES PATENT OFFICE.

JOHN TITLEY, OF PITTSBURG, PENNSYLVANIA.

FENDER FOR STREET-CARS.

SPECIFICATION forming part of Letters Patent No. 540,005, dated May 28, 1895.

Application filed January 25, 1895. Serial No. 536,160. (No model.)

*To all whom it may concern:*

Be it known that I, JOHN TITLEY, a citizen of the United States, residing at Pittsburg, in the county of Allegheny and State of Pennsylvania, have invented certain new and useful Improvements in Fenders for Street-Cars; and I do hereby declare the following to be a full, clear, and exact description of the invention, such as will enable others skilled in the art to which it appertains to make and use the same.

My invention relates to improvements in street car fenders for electric, cable and other street railway cars.

The object of my invention is to provide a fender which, while being cheap and durable, and capable of preventing a person or other object on the track from being thrown under the wheels of the car yet is especially designed to do away with one of the greatest disadvantages found in the fenders now so generally in use, namely, the wrecking of the fender by reason of its contact with the road-bed. It is highly desirable that the fender should ride as close to the road-bed as is possible in order to throw obstacles from the track and prevent them from passing under the wheels, but in practice it has been found very difficult to do this and great injury frequently arises by the collision of fender and road-bed, the fender usually being entirely destroyed and the car often thrown from the track.

While with my invention the fender is carried very close to the road-bed and is attached to the car truck, yet means are provided which prevent any harm being done by contact of the fender with the road-bed or with any protruding stone in the road-bed or other obstacle on the track.

My fender is also constructed to act as a snow plow and to thus aid the progress of the car rather than impede the same which latter is the case after a snow storm with many forms of fenders.

Having these objects in view, my invention consists of the parts and combinations of parts substantially as hereinafter described and claimed. It is illustrated in the accompanying drawings, in which—

Figure 1:
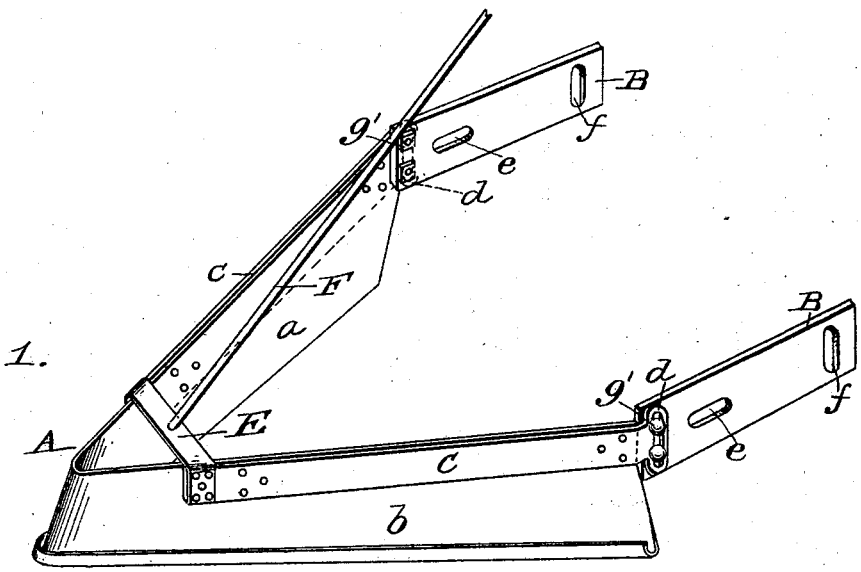
Figure 2:
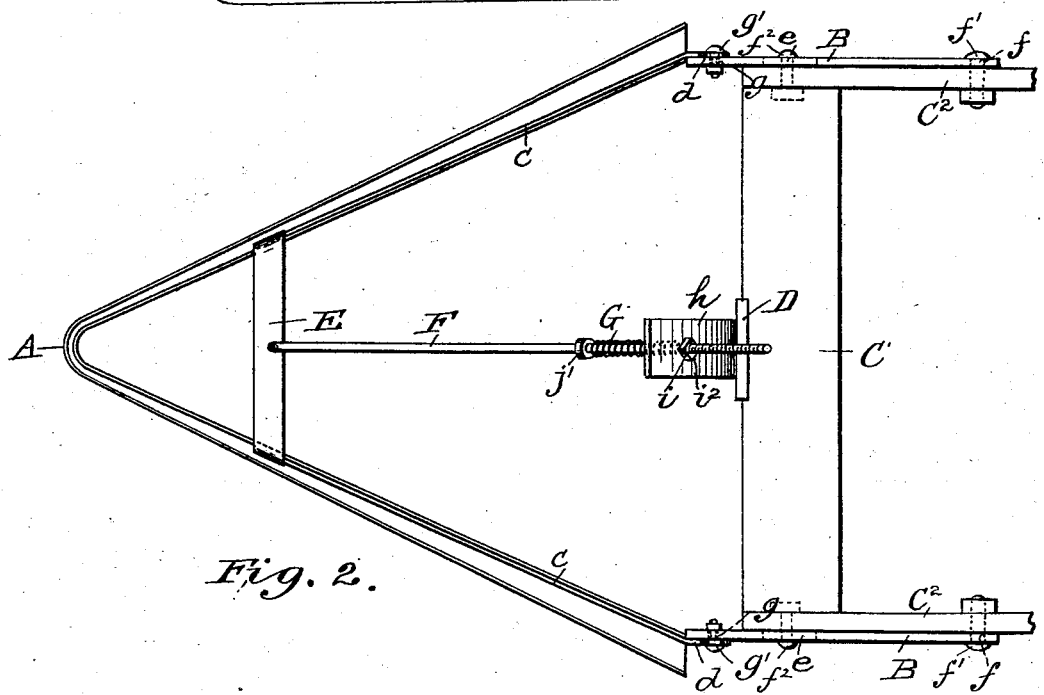

Figure 1 is a perspective view of the apparatus, and Fig. 2 a plan showing attachment of the fender to the truck.

Referring to the drawings, A is the pilot part of the fender, preferably made up of two similar parts, consisting of metal plates connected to each other so as to form a V-shaped structure, and plates, $c$, which are set in and bolted to the top of side plates $a$ and $b$, and said plates $c$, are provided at their rear outer ends with strap eyes, $d$.

E is a cross plate joining the side pieces, $a$ and $b$, near the apex of the fender.

The fender is attached to the car truck $C^2$ by means of two plates, B, B, which are pivoted respectively to the frame of the car truck on each side of the same. The plates, B, are each provided with a longitudinal slot, $e$, a vertical slot, $f$, and screw threaded holes, $g$.

The fender proper is pivotally attached directly to the plates, B, in the manner shown in the drawings. It will be seen that the slotted eyes, $d$, of the plates, $c$, are turned vertically and are placed directly over the screw holes, $g$. They are held to the plates, B, by screws or bolts, $g'$. It will thus be noticed that the eyes, $d$, permit of the fender being set at different distances from the surface of the road bed as may be desired. Screw bolts $f^2$, and $f'$ are also used with slots, $e$ and $f$, respectively to connect the plate, B, to the truck frame. Owing to the longitudinal and vertical slots in the plates, B, and the manner of fastening said plates to the car-truck the fender is allowed a certain amount of vertical and longitudinal movement thus rendering the fender somewhat yielding. This flexibility permits the yielding of the fender to ordinary stationary obstructions, sufficient to lift it over such obstructions, but not sufficient to overcome the ordinary functions of a fender.

C' is a brake beam of the usual style and is connected to the car truck in the ordinary manner. Fastened to and extending upwardly from this brake beam is a plate, D, having a projection, $h$, slightly forward of and at an angle to the plate, D. The projection, $h$ is provided with a hole, $i$. Rigidly fastened to the cross brace, E, and extending inwardly and inclined upwardly therefrom is a rod, F, whose inner end passes through the hole, $i$, of the projection, $h$, of the plate, D.

G is a spring surrounding the rod, F, immediately in front of the projection, $h$, and is held in position by means of a collar, $j$, on the rod and the said projection, h. That part of the rod, F, or a portion of the part which passes through the projection is screw-threaded and is provided with a nut, $i^2$, the purpose of which is to tighten or loosen the tension on the spring, G, as is desired. The spring serves to force the fender back into its normal position, after it has been raised from the track.

The two similar parts, a and b, have their lower edges rolled or curved.

The fork or nose of the fender is more curved and of less width than the ends which are attached to the car-truck.

Having thus described my invention, what I claim is—

1. The combination of a fender, the car truck, slotted bars secured to said truck to which the rear ends of the fender are pivoted, the brake-beam, the plate D, and its projection secured to said brake-beam, a rod passing through said projection and having one end rigidly fastened to the fender-brace, and a spring on said rod, substantially as described.

2. A car fender provided at its rear ends with eyes, a truck provided with slotted bars to which said fender is hung, each of said bars provided with a longitudinal slot and vertical slot, bolts passing through said slots and connected to the truck, whereby the fender and said bars have a flexible connection with and movement on said truck, substantially as described.

3. A fender or pilot, consisting of the two similar parts, a and b, plates, c, terminating at one end in eyes, d, in combination with the car truck provided with slotted bars, to which said fender is hung, a brake-beam provided with the plate, D, and its projection, fender-brace, E, a rod rigidly fastened to said brace at one end and at its other end passing through the projection of the plate, D, a spring on said rod, said spring abutting against said projection and means for changing the tension of said spring, substantially as described.

In testimony whereof I affix my signature in presence of two witnesses.

JOHN TITLEY.

Witnesses:
W. G. DOOLITTLE,
JOHN M. PRESCOTT, Jr.